Feb. 21, 1933.  J. H. THEISS  1,898,857
PROTECTING PHOTOGRAPHIC ELEMENT
Filed Oct. 29, 1930
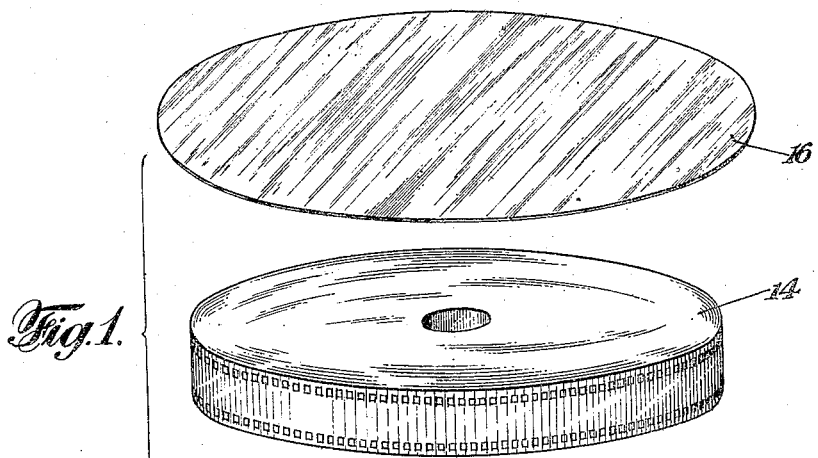
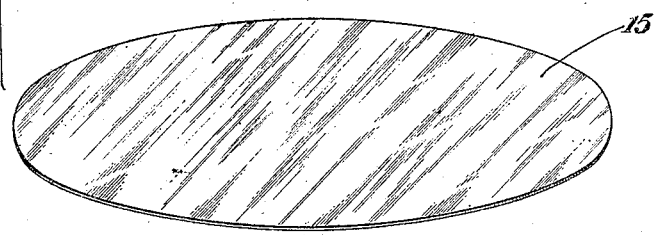
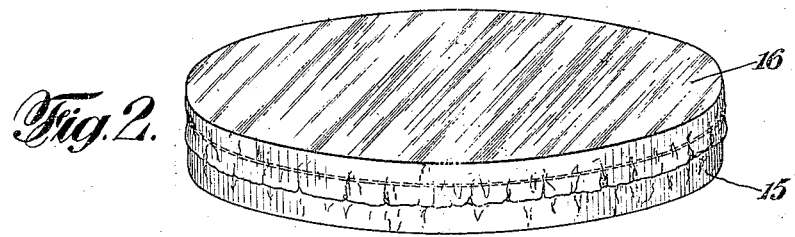
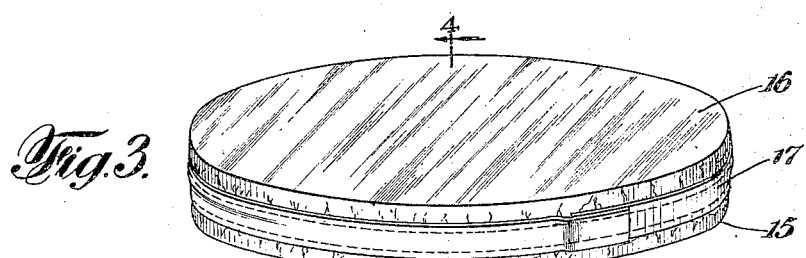
INVENTOR
John H. Theiss
BY his ATTORNEY Patented Feb. 21, 1933

1,898,857

UNITED STATES PATENT OFFICE

JOHN H. THEISS, OF METUCHEN, NEW JERSEY

PROTECTING PHOTOGRAPHIC ELEMENT

Application filed October 29, 1930. Serial No. 491,981.

This invention relates to a novel package for the protection and preservation of photographic elements, particularly light sensitive motion picture film.

Light sensitive photographic elements have long been encased in various light-proof wrappings, usually comprising one or more layers or coverings of black paper. Rolls of motion picture film are shipped in similar wrappings plus the additional protection of a metal shipping container. Due to the nature of that industry such film is subjected to an excessive amount of handling and shipping from point to point. The resulting continual agitation of the roll of film in its light-proof paper wrapping and within the metal container frequently causes serious contamination and fogging of the film. This is partly due to the fact that the light-proof paper disintegrates to the extent that an accumulation of lint and particles of foreign matter find their way on to the light-sensitive emulsion on the film and also onto the lens and other camera members where they have an obviously injurious effect on the film.

Many attempts have been made to overcome this contamination and fogging and many different types of light-proof paper wrappings have been made and tested with this end in view. The continual testing of these papers necessary in attempting to combat these conditions is an added source of trouble and material expense to the film manufacturer. While some of these light-proof papers have reduced the harmful accumulation of lint and foreign particles, it has nevertheless been found that under the varying conditions of storage and shipment the film is not effectively protected or preserved thereby but still remains subject to certain fogging effects not prevented by the various papers used in the commercial wrappings of motion picture film.

I have found this additional and critical cause of contamination and of fogging to be due to the fact that the above mentioned light sensitive papers not only contain inherent and harmful impurities but such papers are also subject to deterioration reactions during storage or shipment within the metal container and while subjected to variations in the temperature and in the moisture content of the atmosphere. One of the results of these conditions is that these deterioration reactions give rise to emanations within the metal container 19 and within the paper wrapping 18 which are capable of fogging or otherwise impairing or spoiling the photographic properties of the film. After careful research I have successfully overcome these last mentioned critical causes of contamination and fogging as well as various other causes thereof, by means of my herein described improved means of protecting light sensitive photographic elements that efficiently preserves the film and protects it from this hitherto unobstructed impairment.

This invention aims to provide an inexpensive and improved package for protecting photographic elements from various sources of contamination during storage and shipment. Another object is to provide a method of preserving the toughness and flexibility of the film by more efficiently confining therein the residual solvents and moisture necessary to prolong the useful life of the film. Another object is to provide means for protecting the film from variations in the moisture content and temperature of the surrounding atmosphere by means of a protective covering in which the photographic element can be quickly and inexpensively enclosed and sealed. Additional and more specific objects will plainly appear from the detailed description presented herein.

To enable those skilled in the art to use my invention I will as an illustration describe a preferred method of carrying it into effect, with the understanding that modifications may be made and the invention embodied in different forms without departing from its spirit and scope in its broader aspects.

In the accompanying drawing: Fig. 1 shows in perspective a view of a front elevation of a roll of motion picture film and of a preferred form of two sheets of cellulosic material before application to the roll. Fig. 2 shows a similar view of a roll of motion picture film enveloped in a preferred form of my improved protective covering before the application of the sealing tape thereto. Fig. 3 shows a similar view thereof but with a preferred form of sealing tape applied thereto. Fig. 4 shows a diagrammatic cross-sectional view of the film and inner wrapping taken along the line 4—4 in Fig. 3. Fig. 4 also shows diagrammatically, cross section of the outer paper wrapper 18, and the outer metal container 19.

A photographic element such as a roll 14 of motion picture film is first enveloped by my improved covering, a preferred form thereof comprising waterproofed flexible sheeting of cellulosic material such as cellulose nitrate or cellulose acetate compositions, but preferably of regenerated cellulose sheeting. This preferred form of covering consists of two sheets 15 and 16 approximately circular in form and sufficiently greater in diameter, as shown in Fig. 1, than the outside diameter of the roll 14 to permit a suitable overlap thereon as shown in Fig. 2. The edges of these two sheets 15 and 16 are then gathered over the roll 14 of film so that they overlap to a substantial extent as shown in Fig. 2 at approximately the median portion of the periphery of the roll and are sealed in this position by the application of an adhesive tape 17, shown in Fig. 3, forming an airtight seal over the edge of sheet 16.

This covering is applied by means of my novel apparatus set forth in my co-pending application, Serial No. 512,295. The overlapping edge of the sheet 16 is sealed as shown in Fig. 3 preferably by means of the preferred tape coated with the preferred adhesive similar to the tape and adhesive used for sugical purposes and well known in that art. It is important that said covering, said tape, and said adhesive do not contain dyes or ingredients that will harmfully affect the photographic element, and that the adhesive be of such a consistency that it will remain on the tape and not accumulate on the edge of the wrapping where it might subsequently become lodged on the film or photographic element, when the tape is removed.

The photographis element or the film thus protected can then be enclosed in any suitable but inexpensive or untested light-proof wrapping 18 such as one of the many varieties of black paper now notorious in the art. Suitable external wrappings are next applied in the customary manner and the roll of motion picture film thus protected and wrapped is finally placed in its well known metal container 19.

Experiments have shown that a photographic element or a roll of motion picture film thus sealed in a covering of waterproofed cellulosic material is effectively protected against any accumulation of lint or foreign particles from the surface of the emulsion. My improved means also effectively preserves the flexibility and toughness of the film by efficiently confining therein the residual solvents and moisture in the film or in the emulsion that are necessary to prolong their effective life. The film is also thereby protected from harmful effects of the variations in the moisture content and temperature of the surrounding atmosphere. Furthermore, my herein described and improved means efficiently prevents any harmful emanation that may arise from subsequent wrappings or within the container from fogging, contaminating or impairing the photographic element, or film, or the emulsion thereon and consequently permits the use of inexpensive light-proof wrappings that also avoid the added testing expense now prevalent in the art.

Having herein described a preferred embodiment of my invention, I do not desire to be limited thereto since it may be modified or embodied in different forms without departing from its spirit. It is expressly stated that this embodiment is illustrative only and that the invention is not limited to the materials, dimensions, and specific elements described, but comprises all the equivalents of the several cooperating features herein shown and described. Hence I desire to cover all forms and modifications within the language or scope of the appended claim.

What I claim as new and desire to secure by Letters Patent is:

An anti-fogging dust proof protective package comprising a roll of light sensitive cinema film enveloped and sealed in an airtight overlapping covering of water-proofed regenerated cellulose, an overlying wrapper of ordinary light-proof paper and a sealed air-tight metal shipping container encasing said thus protected roll.

In testimony whereof, I have signed my name to this specification this 27th day of October, 1930.

JOHN H. THEISS.